United States Patent
Marlowe et al.

(12) United States Patent Marlowe et al.

(10) Patent No.: US 9,047,580 B1
(45) Date of Patent: Jun. 2, 2015

(54) METHOD, SYSTEM, AND COMPUTER READABLE MEDIUM FOR ELECTRONIC AUDITING

(76) Inventors: Phillip Marlowe, Weddington, NC (US); William Robbins, San Antonio, TX (US)

( * ) Notice: Subject to any disclaimer, the term of this patent is extended or adjusted under 35 U.S.C. 154(b) by 1046 days.

(21) Appl. No.: 12/190,961

(22) Filed: Aug. 13, 2008

Related U.S. Application Data

(60) Provisional application No. 60/964,505, filed on Aug. 13, 2007.

(51) Int. Cl.
G06Q 10/00 (2012.01)
G06Q 10/08 (2012.01)

(52) U.S. Cl.
CPC .................................. G06Q 10/087 (2013.01)

(58) Field of Classification Search
None
See application file for complete search history.

(56) References Cited

U.S. PATENT DOCUMENTS

| | | | |
|---|---|---|---|
| 7,693,791 B2 * | 4/2010 | Hahn-Carlson et al. | 705/40 |
| 2002/0069096 A1 * | 6/2002 | Lindoerfer et al. | 705/7 |
| 2005/0246240 A1 * | 11/2005 | Padilla | 705/26 |

* cited by examiner

*Primary Examiner* — Paul Danneman
(74) *Attorney, Agent, or Firm* — Kilpatrick Townsend & Stockton LLP

(57) ABSTRACT

Embodiments of systems, methods, and computer-readable media for auditing electronic freight bills are disclosed. For example, one embodiment of the present invention is a method including the steps of receiving a first data source comprising a first set of data; receiving a second data source comprising a second set of data; generating a record comprising at least a portion of the first data set and at least a portion of the second data set; and conducting an audit of the record. In another embodiment, a computer-readable media comprises code for carrying out such a method.

22 Claims, 4 Drawing Sheets

METHOD, SYSTEM, AND COMPUTER READABLE MEDIUM FOR ELECTRONIC AUDITING

CROSS REFERENCE TO RELATED APPLICATIONS

The present application claims priority under 35 USC 119(e) from U.S. Provisional Patent Application No. 60/964,505, filed Aug. 13, 2007, which is incorporated by reference herein in its entirety.

FIELD OF INVENTION

The following description generally relates to freight bill auditing and processing and more particularly to automated electronic freight bill auditing and processing.

BACKGROUND

As a greater emphasis is placed upon international manufacturing operations, the transportation and shipping of goods and their components becomes a valuable aspect of a company's business and often a critical aspect of a company's business plan. The logistics in coordinating the shipment and receipt of goods has become increasingly complex. The locations of a company's suppliers have expanded not only to neighboring states or countries but also to locations around the world.

In the present day economy, a company often has numerous manufacturing and/or supplying facilities located around the world. The company can engage a number of carriers to transport goods or products. Conventionally, the carrier issues an invoice to the company to request payment for the transporting of goods and/or products. In some situations where the invoice is an individual invoice, the checking and validating of the invoice may be performed manually. However, even for a relatively small company, a large number of invoices may be received daily. For large companies, 100,000 invoices may be received annually. To audit each invoice manually can require a large amount of resources, both in time and capital, to perform each audit.

The conventional method additionally may also include an invoice being directed to a finance department or other responsible department that may not have direct knowledge of the contents of a shipment or details of a shipment. As a business reality, an individual within the finance department often approves payment of the invoice either without reviewing the invoice or by only performing a quick scan of the invoice. Before the payment of an invoice, there is often little or no review of the terms of an invoice or an underlying manifest that provides details of the shipment. Often discrepancies within the invoice and manifest are not discovered until payment has been submitted. The invoice often may not revisited until 3 or 4 months later.

When a invoice has been authorized to be paid for a wrong amount, wrong goods, or already-paid-for goods, and the payment actually occurs, the process to correct such situation is often time and resource consuming. In some instances, once a bill is paid and paid wrong, 12 to 18 months of back and forth between the carrier and customer involving looking for a document, a backup document, and any other documentation could ensue. No matter the amount of the dispute, from $5.00 to $1,000.00 or more, the same amount of resources must be exerted by both companies with multitudes of paperwork characteristic of the resolution process. Some companies have multiple full-time personnel within their finance department or audit department to deal with short payment claims by carriers, months and years after a bill was paid incorrectly.

Most conventional invoice processes within the shipping freight industry are still largely a manual proposition. Manual process are error prone, and often result in incorrect invoices. Most shippers and/or companies perform their audits post payment, which while better than no audit at all, is expensive, and provides limited feedback to the provider to fix the problem and minimize future mistakes. Also, the capital spent, i.e. the incorrect amounts paid, is tied up for months while the dispute of the money takes place.

Thus what is needed is a more efficient and accurate way to approve accurate payment for an invoice and/or to settle any discrepancies in an invoice associated with freight shipping.

SUMMARY

Described herein are various embodiments that can provide a method, system, and computer readable medium for auditing an electronic freight bill. Some embodiments described herein provide improvements for the invoicing process for the freight shipping industries. Some embodiments can make the invoicing process and payment more efficient and accurate.

In some embodiments, a method for auditing an electronic freight bill can comprise receiving a first data source comprising a first data set; receiving a second data source comprising a second data set; generating a record comprising at least a portion of the first data set and at least a portion of the second data set; and conducting an audit of the record. In some embodiments, a system for auditing an electronic freight bill can comprise a processor configured to receive data from a plurality of data sources; extract at least a portion of data from the plurality of data sources; generate a record comprising the at least a portion of data; and analyze the record to determine whether a discrepancy is present within the record. In some embodiments, a computer readable medium can comprise program code for extracting a first set of data from a first data source; program code for extracting a second set of data from a second data source; program code for generating a record from at least a portion of the first set of data and the second set of data; program code for analyzing the record for the presence of a discrepancy in the record; and program code for generating a notification providing whether said discrepancy is present with the record.

Features of a method, system, or computer readable medium for auditing an electronic freight bill may be accomplished singularly, or in combination, in one or more of the embodiments. As will be realized by those of skill in the art, many different embodiments of a method, system, or computer readable medium are possible. Additional uses, advantages, and features of the method, system, or computer readable medium are set forth in the illustrative embodiments discussed in the detailed description herein and will become more apparent to those skilled in the art upon examination of the following. The illustrative embodiments are mentioned not to limit or define the invention, but to provide examples to aid understanding thereof.

DETAILED DESCRIPTION

Figure 1:
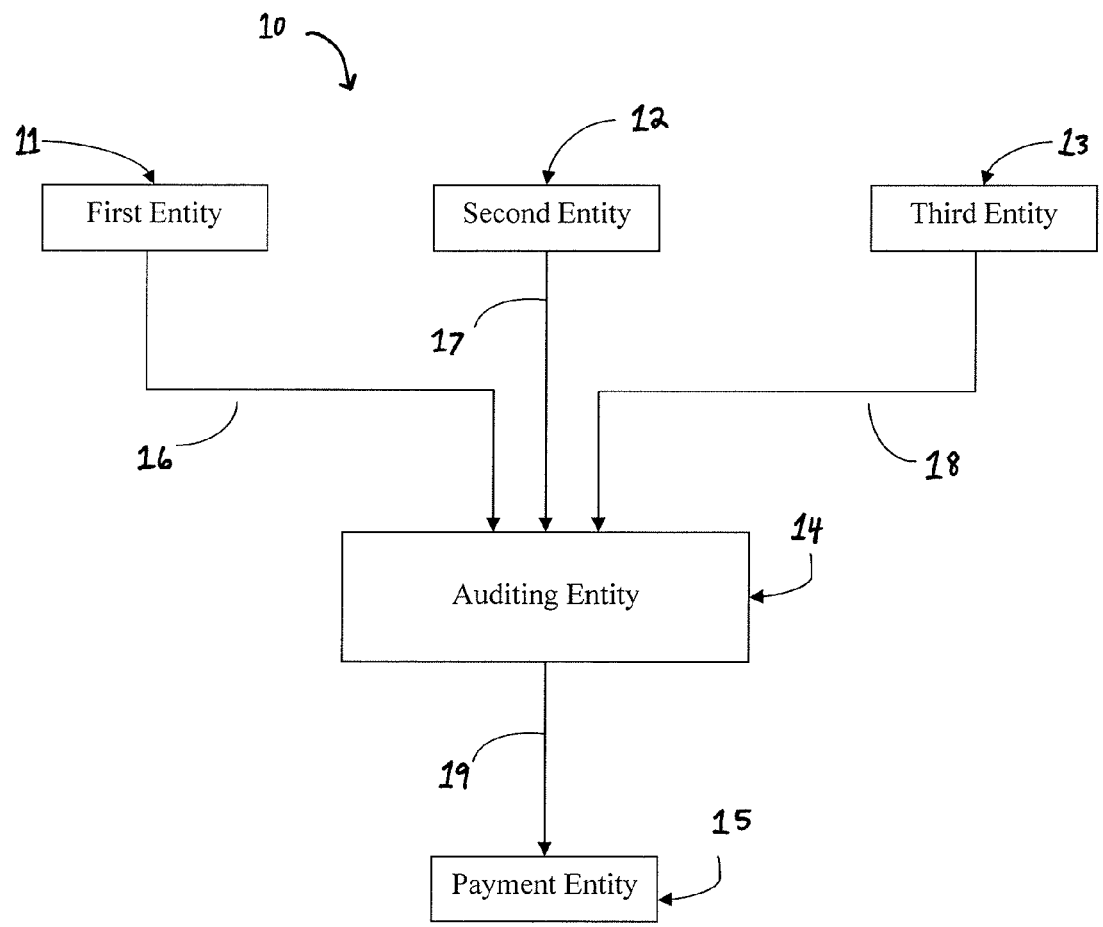
FIG. 1 depicts a method for auditing an electronic freight bill according to an embodiment of the present invention.

Described herein are various embodiments that can provide systems, methods, and computer readable media for auditing an electronic freight bill. Some embodiments of the present invention provide improvements for the invoicing process for the freight shipping industry. Some embodiments of the present invention can make the invoicing process and payment more efficient and accurate.

Some embodiments described herein can provide a method for auditing an electronic freight bill comprising receiving a first data source comprising a first data set; receiving a second data source comprising a second data set; generating a record comprising at least a portion of the first data set and at least a portion of the second data set; and conducting an audit of the record. In some embodiments, the first data source can comprise a manifest. In some embodiments, the second data source can comprise an invoice. In some embodiments, the first data set and/or the second data set can comprise at least one of the following: carrier identification, shipment identification information, bill of lading identification information, purchase order identification information, purchase order location, shipping company identification, consignee identification, vessel identification, carrier identification, shipment origination information, shipment destination information, shipment date, arrival date information, invoice identification information, shipment rate, shipped item identification, shipped commodity information, shipment volume, shipment quantity, shipment weight, container identification information, container size, quantity of containers, carton quantity, carton identification information, and carton contents.

In some embodiments, the method can further comprise receiving a third data source comprising a third data set. The third data source can comprise contractual terms supplied by a company, instructions from an auditing entity, and/or modifications by an auditing entity. In some embodiments, the third data source can comprise other invoices and/or manifests issued by an entity. The record can be comprised of at least a portion of the third data set.

In some embodiments, the method further comprises authorizing payment of an invoice upon completion of the audit. If the record passes the audit, the method can comprise generating an approval notification. If the record fails the audit, the method can comprise generating a failure notification. In some embodiments, when the record fails the audit, a discrepancy notice can be generated. In some embodiments, the discrepancy notice can be sent to an auditing entity which may analyze the record and the noted discrepancy.

In embodiments where a discrepancy notice has been generated, the auditing entity can provide a mechanism where an entity can submit a replacement data source. The replacement data source can comprise a set of data intended to resolve the discrepancy. The replacement data source then can be used to generate a replacement record that can be audited.

In some embodiments, the present invention can provide systems, methods, and computer readable media that perform an audit of a shipment invoice. In some embodiments, systems, methods, and computer readable media of the present invention can identify discrepancies in the invoicing and payment process before the invoice has been paid. When the discrepancy is identified before payment, the carrier can be notified, and the company can be alerted to prevent payment under the wrong terms.

Conventionally, upon receipt of an invoice from a carrier, a company submits payment of the invoice. For even a medium-sized company, a large number of invoices for various products and goods may be received daily. Often to ensure timely delivery, the invoice is received and paid without auditing the invoice to determine the accuracy of the invoice. Conventionally, an audit, if one occurs, often occurs after the goods or products have been delivered.

Some embodiments described herein can provide improvements upon the invoicing process by performing an efficient and accurate audit before any payments have been remitted. In some embodiments, payment of an invoice does not occur until the invoice has been approved by systems, methods, and computer readable media according to the present invention.

The present invention relates generally to methods, systems, and computer readable media for auditing electronic invoices for freight shipments. In the following discussion, the general practice of the invention will be discussed. Afterwards, a method, a system, and a computer readable medium are explained with particular reference to business structure where a company utilizes a logistics entity, a carrier, an auditing entity, and a payment entity to handle various aspects of the shipping process. However, it is to be understood that this use of the method, system, or computer readable medium is simply an exemplary use and should not be considered as limiting. The method, system, and computer readable medium described herein can be practiced with a variety of business structures, such as, but not limited to, company, auditing entity, and carrier; a company, logistics entity, an auditing entity, and carrier; a company, carrier, auditing entity, and payment entity; and/or a company and a carrier. The entities may be a division of the company or a separate company along with any other business relationship that can be utilized within the industry. The company may utilize a structure that integrates any or each of the entities into its business organization. For example, the company may choose to have a department integrated internally to perform the actual payment of the invoices rather than engage an outside entity to perform the payment of all invoices. This and any other business organization structures are contemplated within the scope of the present invention. Additionally, the invention is not limited to use with international ocean freight shipping or air freight situation, as other applications are also contemplated within the scope of the description herein.

Audit herein refers to a careful examination of a document or record for accuracy of the contents therein with the intent to verify the accuracy of the contents. When a document or record is audited according to embodiments described herein, at least a portion of the contents can be analyzed. For example, not to be considered limiting, the auditing process can comprise analyzing the rate or cost for the shipment, the contents of shipment, and/or the identity of the containers according to embodiments of the methods described herein.

Some embodiments of the present invention can provide methods, systems, and computer-readable media for auditing shipping invoices. Some embodiments comprise an application accessed through an Internet web-based portal which receives information, analyzes the information, and provides an audit for accuracy of the invoicing procedures of a shipment. In another embodiment, a computer-readable medium comprises program code for carrying out such a method. In some embodiments, the shipping is international. In some embodiments, the shipment can take place via ocean freight.

In other embodiments, the shipment can take place via air freight. In yet other embodiments, the shipment can take place via land freight.

Some embodiments can provide methods, systems, and computer-readable media that eliminate the need of a paper-battle back and forth after the payment has been sent in order to settle disputes of charges and services. In some embodiments, the methods, systems, and computer readable media may allow a company to have access to its capital for a greater amount of time and may provide some greater level of assurance that the payment is correct. Some embodiments of the present invention can audit the information from a record and not just a dollar amount on an invoice. In some embodiments, the record can be manipulated without distorting the reality of an invoice.

In some embodiments, the methods, systems, and computer readable media can provide an audit of an invoice received for the shipment of goods and products. Some embodiments provide a pre-payment audit of an invoice. The audit can include checking that the terms included on an invoice correspond to the terms included on a corresponding manifest through a shipment record. Thus, errors and discrepancies on the invoice can be identified before payment has been submitted. Appropriate corrections and/or modifications can be quickly and efficiently made in order to minimize the resources that go along with a dispute.

Some embodiments can audit an invoice by comparing the manifest and the invoice through the creation of a record. In some embodiments, the record can comprise a shipment record. In some embodiments, the record can be generated using the data on the manifest and invoice. The record can provide a structure that works in tandem with the invoice. The record can serve as a repository for data from a plurality of sources. Data fields of the record are populated with information from both the manifest and the invoice. A comparison can be automatically made within the data fields of the record. The audit can be performed electronically. In some embodiments, the comparison can be conducted automatically. In some embodiments, methods can be conducted in a portal environment on a web-based application. In some embodiments, the comparison can be performed through the use of a processor. The information may be shared among the customer, the supplier, the carrier, and other parties of interest.

In some embodiments, if the terms match between a manifest and an invoice, the invoice can be approved for immediate payment. In some embodiments, the approval may be automatic. In some embodiments, if the terms within the record that are populated by data from the manifest and the invoice are substantially consistent, the invoice can be authorized for payment. Substantially consistent means that the terms are substantially consistent within a defined range of tolerances. In some embodiments, if the terms between a manifest and invoice differ, an electronic review by an auditing entity can be performed. The auditing entity can identify the discrepancy or discrepancies between a manifest and an invoice. In some embodiments, once a discrepancy has been identified, the auditing company can approve the payment of the invoice if the discrepancy is of a minor nature. In other embodiments, once a discrepancy has been identified, the auditing company may flag the discrepancy and draw it to the attention of the entities involved. In some embodiments, the flagging and notification of the discrepancy may provide notice so that a quick resolution may occur before the invoice has been paid. If an entity, such as a carrier, agrees the discrepancy is in error on its behalf, then the carrier can resubmit a corrected invoice. If the entity is not in agreement with the source of the discrepancy, the entity can engage the parties in a process to resolve the dispute. In some embodiments, the invoice may not be paid until all parties are in agreement with the terms of the invoice.

The pre-payment audit according to some embodiments described herein can achieve a number of benefits for the parties involved. For example, but not to be considered limiting, the audit can identify that the invoice is the correct invoice for the company; identify that it is proper for the company to pay the invoice; determine whether the invoice has already been paid; determine whether materials or services on the invoice is something that has already been paid for on a separate invoice; determine that the invoice is the company's and has not been paid yet; and determine whether the invoice is for the right bundle of services.

In some embodiments, a web-based program can provide a populated shipment record. The shipment record can provide a repository useful for the auditing of shipping invoices. An authorized user may access the shipment record through a network, such as the Internet, in order to obtain current information relating to a shipment. Any standard web server application may be utilized. The web server can respond to Hypertext Transfer Protocol (HTTP) requests by executing code. The web server may be a single computer system, or may be implemented as a network of computer processors. Examples of web servers are mainframe computers, networked computers, a processor-based device, and similar types of systems and devices.

The web server can comprise a processor, which, in turn, can be in communication with a computer-readable medium. The processor comprises a computer-readable medium, such as a random access memory (RAM) coupled to the processor. The processor executes computer-executable program instructions stored in memory, such as executing one or more computer programs for generating a record. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable media, that may store instructions that, when executed by the processor, can cause the processor to perform the steps described herein as carried out, or assisted, by a processor. Embodiments of computer-readable media may comprise, but are not limited to, an electronic, optical, magnetic, or other storage or transmission device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other forms of computer-readable media may transmit or carry instructions to a computer, such as a router, private or public network, or other transmission device or channel. The instructions may comprise code from any suitable computer-programming language, including, for example, .NET, C, C++, C#, Visual Basic, Java, Python, Perl, and JavaScript. The processor, and the processing, described may be in one or more structures, and may be dispersed through one or more structures. The processor may comprise code for carrying out one or more of the methods (or parts of methods) described herein.

The processor may be in communication with any number of other external or internal devices such as a mouse, a CD-ROM, a keyboard, a display, or other input or output devices.

The web server may be in communication with a network, such as the Internet. Accordingly, a user may access the shipment record on the web server over the Internet. For example, a user may access the shipment record via a web portal, by entering a user identifier and a password. The web portal may be accessible through a browser, such as Microsoft's Internet Explorer, or Mozilla's Firefox.

In some embodiments, a shipping company may generate a manifest. In some embodiments, the manifest can be generated by a logistics entity. The manifest can contain information which describes and characterizes the shipment. The manifest can serve as shipping notification that is sent to the company to notify the entity of the shipment.

The manifest may comprise logic groups of data called data fields. Each data field may be made up of one or more data elements. In some embodiments, the manifest contains information identifying the shipment. A manifest can comprise a plurality of data fields and data elements, for example, but not to be considered limiting, the plurality of data fields can comprise at least one of the following: carrier identification, shipment identification information, bill of lading identification information, shipping company identification, shipment origination information, shipment destination information, shipment date, vessel identification, arrival date information, purchase order identification information, shipped item identification, shipped commodity information, container identification information, container size, quantity of containers, shipment volume, shipment quantity, shipment weight, shipment rate, carton quantity, carton identification information, and carton contents.

In some embodiments, the manifest may be an 856/ASN. The 856/ASN refers to an electronic shipping manifest that may comprise detailed shipping information such as purchase order number, total number of cartons, carton serial numbers, contents of each carton tied to specific line items on a specific purchase order, carrier that accepted the shipment, shipment date, or other like information. The manifest can be created at the time of shipment and sent by the supplier or logistics entity to the customer so that it may arrive before the shipment arrives. The customer holds the manifest to wait for the physical shipment to arrive. In some embodiments, the manifest can be sent directly to an auditing entity.

In some embodiments, the manifest can be submitted electronically to the auditing entity. The information contained on the manifest can be extracted and used to populate a shipment record. The shipment record can contain particular extracted information from the manifest. This information can be used to audit a corresponding invoice, as will be discussed in further detail below.

In some embodiments, a carrier generates an invoice for each shipment. In some embodiments, the invoice may be generated electronically. The invoice includes identifying information about each shipment, such as, but not to be considered limiting, the identifying information can comprise at least one of the following: carrier identification, shipment identification information, bill of lading identification information, purchase order identification information, purchase order location, shipping company identification, consignee identification, vessel identification, carrier identification, shipment origination information, shipment destination information, shipment date, arrival date information, invoice identification information, shipment rate, shipped item identification, shipped commodity information, shipment volume, shipment quantity, shipment weight, container identification information, container size, quantity of containers, carton quantity, carton identification information, and carton contents.

The information included on the invoice can be extracted and used to populate a plurality of data fields within the shipment record. The shipment record can contain particular extracted information from the invoice to include on the shipment record. This information can be used to audit the invoice, as will be discussed in further detail below.

Conventionally, upon receipt of an invoice, a company submits payment of the invoice without first performing an audit. For even a medium sized company, a large number of invoices may be received daily. Often to ensure timely delivery, the invoice is received and paid without auditing the contents of the invoice to determine the accuracy of the contents of the invoice. In the conventional methods, the auditing often occurs after the goods or products have been delivered. Also, conventional electronic auditing tools are limited to the use of domestic zip codes and the matching rate. International shipping has a variety of different considerations that current domestic auditing tools cannot handle and are not adaptable.

Some embodiments of the present invention can provide methods, systems, and computer readable media to perform an electronic audit of an invoice. In some embodiments, a record can be generated to audit an invoice. A record herein refers to a document, structure, web browser page, portal, or other form providing a repository of data. The record can comprise or be referred to as a shipment record. The shipment record comprises a separate document from the manifest and the invoice. In some embodiments, a processor extracts certain information from the manifest and the invoice as provided to the auditing entity and inputs the information into the shipment record. In some embodiments, at least one processor extracts the particular data from the invoice and/or manifest. In some embodiments, the shipment record can be generated by the auditing entity.

The shipment record provides a record that serves as a discrete document or repository where information from a plurality of sources can be directly compared. In some embodiments, the shipment record can be presented in a portal environment. The shipment record can contain a plurality of data fields. These data fields can include, but are not limited to, at least one of the following: carrier identification, shipment identification information, bill of lading identification information, shipping company identification, shipment origination information, shipment destination information, shipment date, vessel identification, arrival date information, purchase order identification information, shipped item identification, shipped commodity information, container identification information, container size, quantity of containers, shipment volume, shipment quantity, shipment weight, shipment rate, carton quantity, carton identification information, and carton contents.

The shipment record serves as a repository for the extracted data from a plurality of sources. The data fields can be populated by a plurality of sources. The plurality of sources can comprise the manifest, the invoice, information supplied to the auditing entity by the company such as contract term information, SKUs, commodity identifications, and other like information and sources. In some embodiments, the data fields can be populated by the auditing entity. In some embodiments, the data fields can be populated by a combination of any or all of the previously recited sources.

In some embodiments a processor can contain program code that directs a processor to extract particular information from the plurality of sources. The processor can identify each particular item that corresponds to each data field, extract the information, and input the information into the corresponding data field within the shipment record.

In some embodiments, the shipment record can include data fields that can be updated by an auditing entity. For example, the shipment record can include updateable audit status data fields, internal comments data fields, public comments data fields, discrepancy reasons data fields, and other like updateable data fields.

The shipment record can be viewed by authorized users. Authorized users can include the auditing entity, the company, the logistics entity, the carrier, the payment entity, and any other entity that has been granted access by the auditing entity. Different levels of access can be granted to each authorized user. In some embodiments, an authorized user can be granted full access that may include capabilities of manipulating the shipment record. In other embodiments, an authorized user can be granted less user access, for example, access to only comment editing or other restricted field editing may be provided. In other embodiments, an authorized user may be granted view-only access.

In some embodiments, the shipment record can be manipulated and/or modified. In the event that the shipment record is modified, an audit trail can be generated. The audit trail can comprise a record of the particular modification, the identity of the authorized user that makes the modification, the time and date in which the modification has been made, any comments by a authorized user, and other like information. The shipment record can include a data field that provides a history of modifications and the appropriate time stamp for each modification.

Upon the matching of the invoice to a manifest and the generating of a shipment record, an audit can be performed. In some embodiments, if the terms of the invoice and the terms of the manifest as inputted into the shipment record are consistent, the invoice can be automatically approved for payment. In other embodiments, if the terms of the invoice and the terms of the manifest as inputted into the shipment record are substantially consistent, the invoice can be automatically approved for payment. Substantially consistent herein refers to terms being consistent within a defined range of tolerances. The range of tolerances can be configured to the individual relationship. For example, but not to be considered limiting, an acceptable tolerance may be a final cost that differs by less than $1.00. The range of tolerances may be used to account for a business reality of carrier inconsistency and imprecision. Upon approval, a message can be sent to the company or payment company authorizing the payment of the invoice.

In some embodiments, if the terms of the invoice and the terms of the manifest as inputted into the shipment record do not match, the shipment record may not be automatically approved. In some embodiments, the discrepancies can be assigned status codes and different notations and then assigned to work queues for the auditing entity that represent the invoices that are not yet approved. The shipment record can be directed to a discrepancy list or grouping that requires additional attention. An auditing entity can review the electronic shipment record to determine the source of the discrepancy. In some embodiments, the discrepancy can be a minor discrepancy. In the event that the discrepancy is minor, the audit entity may modify the shipment record and approve the payment of the invoice.

In an exemplary embodiment illustrating a situation where the auditing entity may modify the shipment record to resolve a discrepancy can include the following: all other terms being consistent, the origination point of the bill of lading on the invoice is identified as port X and the origination point of the bill of lading on the manifest is identified as port Y. Under the original overriding contractual agreement between the parties, port Y was the only acceptable port listed. Due to recent business developments, port X may have been created since the contract terms had been negotiated and is located in physical proximity to both port Y and manufacturing facility. No other reason would exist to prevent Port X from being an acceptable origination location other than it not being contemplated at the time of the contract. Assuming all other terms are consistent, e.g. cost, container identification, SKUs, POs, the discrepancy of an origination point may be overridden by the auditing entity to authorize payment of the invoice.

In some embodiments, the audit of the record can comprise analyzing the data within the audit in view of a third source of data. In some embodiments, the contents of the record can be compared to previously audited invoices. For example, the record can comprise a container identification number and container size information as submitted on an invoice. During the audit of the record, the container identification number and container size information can be analyzed and compared to other invoices by a carrier or records that are stored within a storage medium accessible by the auditing processor. If the same container identification number and container size information appear within two different invoices, the auditing process can flag the record as a discrepancy. In such a case, the invoice may be a duplicate bill. Some embodiments of the present invention can prevent the authorization of duplicate payment for the same shipment. Other similar variations of auditing and validating the contents of the cargo are contemplated within the scope of the description herein.

In other embodiments, where the discrepancy is not a minor discrepancy, the auditing process can flag the shipment record and draw the invoice to the entities' attention. In some embodiments, the notification can comprise an automatically generated discrepancy report list. In some embodiments, the discrepancy report list can be generated daily. In some embodiments, an electronic message can be sent to the particular entities. In some embodiments, an entity can log into the web portal via a user name and password to access the web portal system.

For example, if an error exists on the amount of charges listed on the invoice, the auditing process can notify the carrier of the discrepancy. The carrier, if it agrees with the error in the discrepancy, can submit a replacement invoice to correct the discrepancy. The shipment record can be updated with information contained within the replacement invoice. If the new shipment record contains consistent terms, the invoice can be automatically authorized for payment. In some embodiments, the methods described herein can prevent the payment of an incorrect invoice because the payment entity has not been authorized to pay the invoice.

In some embodiments, an invoice can be triggered either as a new document or a resubmitted invoice. The auditing process occurs where a comparison is made within a shipment record. If the invoice passes the audit, a message can be sent to a payment entity authorizing the payment of the invoice. If the invoice fails the audit, a discrepancy report can be generated. The discrepancy report can provide a list of inconsistent shipment records with the type of discrepancy noted. Within the discrepancy report, the type of discrepancy can be available for a carrier's review. Upon review of a discrepancy, the carrier can create or update a replacement invoice or bill of lading data resolving the discrepancy. The replacement invoice passes through the same cycle to undergo an audit. If the replacement invoice resolves the discrepancy, the shipment record will pass the audit. If the replacement invoice fails to resolve the discrepancy, the discrepancy will appear in its updated form on the discrepancy report.

In the above example, if the carrier does not agree with the discrepancy in the invoice and believes that no error has been made, the carrier can initiate a dispute process with the company, logistics entity, and/or payment entity. In the limited situation where the dispute has arisen, it may be necessary to engage in paper audits and the exchanging of forms. However, even if the audit reaches this point, the dispute has arisen before the payment of the invoice.

In some embodiments, the shipment record can only be modified by the auditing entity. In other embodiments, the shipment record can be modified by a carrier. In some embodiments, a carrier can modify the size of container used in the shipment.

Referring to the exemplary embodiment depicted in FIG. 1, the auditing entity 14 receives a first data source 16 from a first entity 11, a second data source 17 from a second entity 12, and third data source 18 from a third entity 13. In some embodiments, the first data source 16 can comprise a manifest. In some embodiments, the second data source 17 can comprise an invoice. In some embodiments, the first entity 11 can be a third party logistics company that is assigned to deal directly with factories, take bookings and reservations, access availability for shipments, make reservations with carriers, and/or coordinate processes associated with shipping. The second entity 12 can be a carrier that can transport the freight from the logistics company to the company. A shipment record can be created by the auditing entity 14 that bridges the information in the manifest (first data source 16) and the invoice (second data source 17). The auditing entity 14 can conduct the audit of the shipment record.

The auditing entity can comprise a system of processor configured to import the manifest data and create a shipment record awaiting a corresponding invoice. Purchase Orders (PO) and stock keeping unit (SKU) information can be validated by the auditing entity. In some embodiments, the auditing entity can comprise a system of processor configured to import invoice data and match the invoice data with the corresponding manifest data. In some embodiments, container numbers can be validated by the auditing entity. The methods of auditing described herein can generate messages to notify the carriers and other entities of the status of each invoice. In some embodiments, if the manifest and invoice contain consistent and/or substantially consistent terms (within a defined tolerance limit), the auditing process can approve the payment of the invoice. A message can be sent to the payment entity 15 authorizing the payment of the correct invoice.

Figure 2:
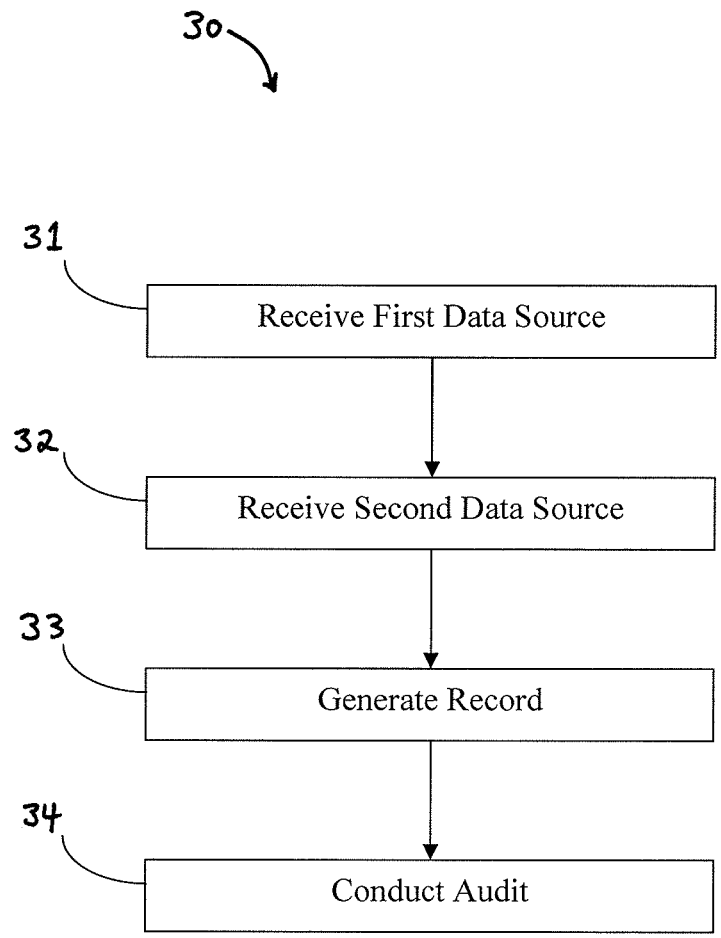
FIG. 2 depicts a method for auditing an electronic freight bill according to an embodiment of the present invention.

FIG. 2 shows steps of a method 30 for auditing an electronic freight bill. In such an embodiment, the method 30 comprises receiving a first data source (31) and receiving a second data source (32). In some embodiments, the first data source comprises a manifest. In some embodiments, the second data source comprises an invoice. The method 30 further comprises generating a record (33). The record can be generated from at least a portion of data of the first data source and at least a portion of data of the second data source. The method 30 further comprises conducting an audit (34) of the record.

Figure 3:
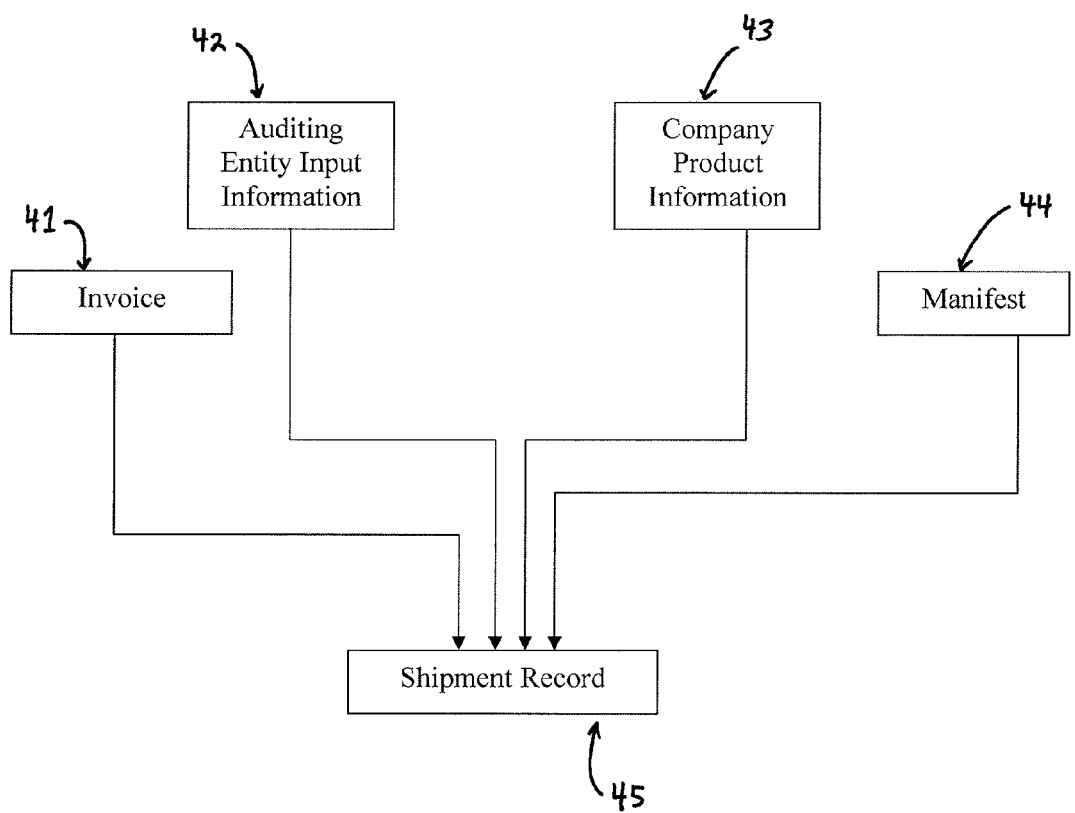
FIG. 3 depicts a schematic showing an exemplary plurality of sources used in part to generate a record according to an embodiment of the present invention

FIG. 3 depicts a schematic of the structure of the systems and methods of the present invention. A shipment record 45 can generated from a plurality of data sources. The plurality of data sources can comprise an invoice 41, auditing entity input information 42, company product and contract information 43, and a manifest 44. FIG. 3 depicts the shipment record 45 as a central repository storing data from the plurality of sources.

Figure 4:
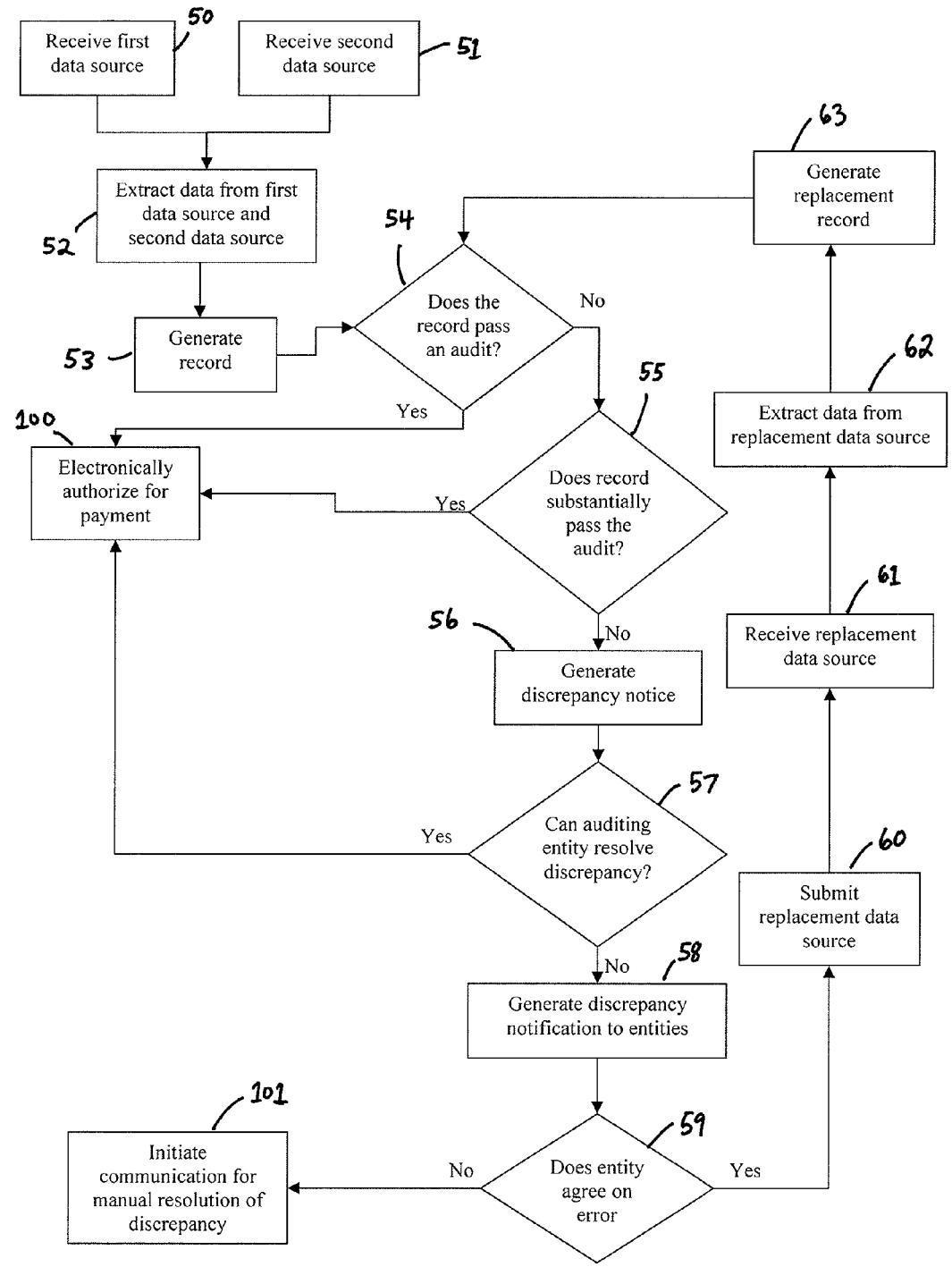
FIG. 4 depicts a schematic of a method for auditing an electronic freight bill according to an embodiment of the present invention.

FIG. 4 shows an exemplary embodiment of a method according to the description herein. The method can comprise receiving a first data source (50) and a second data source (51). A system or processor, as described above, can extract at least a portion of data from the first data source and the second data source (52). Next, a record can be generated comprising at least a portion of data from the first data source and the second data source (53). The record can then be audited (54). The audit comprises analyzing the record to determine whether any discrepancies exist within the record. If the record passes the audit, payment of an invoice can be electronically authorized (100).

If the record does not pass the audit, the record can be further analyzed to determine whether the record substantially passes the audit (55). For example, as described above, if the discrepancy falls within a defined tolerance, then the record may pass the audit. If so, payment of an invoice can be electronically authorized (100). If the record does not substantially pass the audit, a discrepancy notification can be generated (56). The discrepancy notification is first reviewed by the auditing entity. If the auditing entity can resolve the discrepancy, then payment of an invoice can be electronically authorized (100). If the auditing entity cannot resolve the discrepancy, a discrepancy notification to the entities involved in the transaction can be generated (58).

The discrepancy notification to the entities can comprise identifying the source of the discrepancy. If one of the entities reviews the notification and recognizes an error on its part, the entity can submit its respective data to resolve the issue by submitting a replacement data source (60). If the entities disagree on the source of the discrepancy, manual communication between the parties can be initiated to resolve any discrepancy (101).

Upon submitting the replacement data source (60), the auditing entity receives the replacement data source (61). The system or processor, as described above, can extract at least a portion of data from the replacement data source (62). Next, a replacement record can be generated comprising at least a portion of data from the replacement data source (63). The replacement record can then be audited (54). The audit comprises analyzing the record to determine whether any discrepancies exist within the record. If the record passes the audit, payment of an invoice can be electronically authorized (100). If not, the process continues as described above.

Although the present invention has been described with reference to particular embodiments, its should be recognized that these embodiments are merely illustrative of the principles of the present invention. Those of ordinary skill in the art will appreciate that systems, methods, and computer readable media according to the present invention may be constructed and implemented in other ways and embodiments. Accordingly, the description herein should not be read as limiting the present invention, as other embodiments also fall within the scope of the present invention. Numerous modifications and adaptations thereof will be apparent to those skilled in the art without departing from the spirit and scope of the this invention.

What is claimed is:

1. A computer implemented method for auditing an electronic freight bill comprising:

receiving, by a processor, a manifest comprising a first data set;

receiving, by the processor, an invoice comprising a second data set;

generating, by the processor, a shipment record comprising at least a portion of the first data set and at least a portion of the second data set, wherein the shipment record comprises a plurality of data fields configured to be populated with information from the manifest and the invoice;

receiving, by the processor, a third data set comprising one or more of previously audited invoices or separate shipping manifests; and conducting, by the processor, an audit of the shipment record prior to processing a payment for the invoice, wherein auditing the shipment record comprises analyzing the shipment record to determine whether there is a discrepancy between the first data set, the second data set, and the third data set;

and wherein, upon a failure of the audit, the method further comprises:

receiving, by a processor, a replacement data source comprising a replacement data set;

generating, by a processor, a replacement shipment record comprising at least a portion of the replacement data set; and conducting, by a processor, an audit of the replacement shipment record.

2. The computer implemented method of claim 1, wherein the first data set comprises at least one of:

carrier identification, shipment identification information, bill of lading identification information, shipping company identification, shipment origination information, shipment destination information, shipment date, vessel identification, arrival date information, purchase order identification information, shipped item identification, shipped commodity information, container identification information, container size, quantity of containers, shipment volume, shipment quantity, shipment weight, shipment rate, carton quantity, carton identification information, and carton contents.

3. The computer implemented method of claim 1, wherein the second data set comprises at least one of:

carrier identification, shipment identification information, bill of lading identification information, purchase order identification information, purchase order location, shipping company identification, consignee identification, vessel identification, carrier identification, shipment origination information, shipment destination information, shipment date, arrival date information, invoice identification information, shipment rate, shipped item identification, shipped commodity information, shipment volume, shipment quantity, shipment weight, container identification information, container size, quantity of containers, carton quantity, carton identification information, and carton contents.

4. The computer implemented method of claim 1, wherein the shipment record comprises a repository for data from a plurality of sources.

5. The computer implemented method of claim 4, wherein the plurality of sources comprise at least one of the first data source, the second data source, the third data source, contractual information, an auditing entity, and a history of data sets.

6. The computer implemented method of claim 1, wherein the shipment record further comprises at least part of the third data set.

7. The computer implemented method of claim 1, further comprising:

authorizing, by a processor, payment of an invoice upon completion of the audit.

8. The computer implemented method of claim 1, further comprising:

generating, by a processor, an approval notification message upon completion of the audit.

9. The computer implemented method of claim 8, wherein the approval notification message provides authorization for a payment.

10. The computer implemented method of claim 1, further comprising:

generating, by a processor, a failure notification message upon completion of the audit.

11. The computer implemented method of claim 1, further comprising:

generating, by a processor, a discrepancy notification upon completion of the audit.

12. The computer implemented method of claim 11, wherein upon generating a discrepancy notification, the method further comprises:

analyzing, by a processor, the shipment record by an auditing entity.

13. The computer implemented method of claim 1, further comprising:

determining, by a processor, whether the shipment record passes the audit.

14. The computer implemented method of claim 13, wherein determining whether the shipment record passes the audit comprises analyzing any discrepancy in corresponding data fields to determine whether the discrepancy is within a defined range of tolerance.

15. The computer implemented method of claim 14, wherein the shipment record passes the audit when the discrepancy is within the defined range of tolerance.

16. The computer implemented method of claim 13, further comprising:

generating, by a processor, a list comprising at least two shipment records that have failed the audit, wherein the list is viewed by an auditing entity.

17. A system for auditing an electronic freight bill comprising:

a processor configured to receive data from a plurality of data sources, wherein the plurality of data sources comprises at least a manifest, an invoice, and a third data set comprising one or more of previously audited invoices or separate shipping manifests;

extract at least a portion of data from each of the plurality of data sources;

generate a shipment record comprising at least a portion of the data from the manifest and the invoice, wherein the shipment record comprises a plurality of data fields configured to be populated with information from the manifest and the invoice; and audit the shipment record to determine whether a discrepancy is present in the data extracted from the plurality of data sources, wherein the audit occurs prior to processing a payment for the invoice;

and wherein, upon a failure of the audit, the processor is further configured to:

receive a replacement data source comprising a replacement data set;

generate a replacement shipment record comprising at least a portion of the replacement data set; and conduct an audit of the replacement shipment record.

18. The system of claim 17, wherein the processor is further configured to transmit a notification whether the shipment record comprises a discrepancy.

19. The system of claim 17, wherein the notification comprises an authorization for payment of an invoice.

20. The system of claim 17, further comprising:
a data storage device connected to the processor.

21. A computer readable medium comprising program code, the program code comprising:
program code for extracting a first set of data from a manifest;
program code for extracting a second set of data from an invoice;
program code for generating a shipment record from at least a portion of the first set of data and at least a portion of the second set of data, wherein the shipment record comprises a plurality of data fields configured to be populated with information from the manifest and the invoice;
program code for extracting a third set of data from one or more previously audited invoices or separate shipping manifests;
program code for conducting an audit of the shipment record prior to processing a payment for the invoice, wherein auditing the shipment record comprises analyzing the shipment record to determine whether there is a discrepancy between the first data set, the second data set, and the third data set;
program code for generating a notification providing whether a discrepancy is present with the shipment record; and
program code for, upon a failure of the audit:
receiving a replacement data source comprising a replacement data set;
generating a replacement shipment record comprising at least a portion of the replacement data set; and
conducting an audit of the replacement shipment record.

22. The computer readable medium of claim 21, further comprising
program code for determining whether to authorize the payment of an invoice.

\* \* \* \* \*